(12) United States Patent
Yamazaki et al.

(10) Patent No.: US 6,767,500 B2
(45) Date of Patent: Jul. 27, 2004

(54) FILM FORMATION METHOD CAPABLE OF PREVENTING FLUCTUATION OF RIBBON

(75) Inventors: Hidekazu Yamazaki, Kanagawa (JP); Yukihiro Katai, Kanagawa (JP); Toshikazu Nakamura, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 537 days.

(21) Appl. No.: 09/911,394

(22) Filed: Jul. 25, 2001

(65) Prior Publication Data

US 2002/0050668 A1 May 2, 2002

(30) Foreign Application Priority Data

Jul. 25, 2000 (JP) ........................................ 2000-223250
Mar. 14, 2001 (JP) ........................................ 2001-071541

(51) Int. Cl.$^7$ ............................................. B29C 41/24
(52) U.S. Cl. ........................ 264/556; 264/101; 264/216; 264/217; 425/210; 425/224
(58) Field of Search ............................... 264/556, 101, 264/102, 216, 217; 425/210, 224

(56) References Cited

U.S. PATENT DOCUMENTS 3,520,964 A * 7/1970 Metz, Jr.
4,310,295 A * 1/1982 Heyer ........................ 425/224
6,368,534 B1 * 4/2002 Nakamura et al. .......... 264/216

FOREIGN PATENT DOCUMENTS

| JP | 62-38133 | 2/1987 | ............ A61B/3/14 |
| JP | 63-57222 | 3/1988 | ............ B29C/65/70 |
| JP | 02-052721 | 2/1990 | ............ B29C/47/88 |
| JP | 06-155494 | 6/1994 | ............ B29C/41/12 |
| JP | 10-264185 | 6/1998 | ............ B29C/41/24 |

OTHER PUBLICATIONS

Japanese Abstract No. 11198285, dated Jul. 27, 1999.

* cited by examiner

Primary Examiner—Mathieu D. Vargot
(74) Attorney, Agent, or Firm—Sughrue Mion, PLLC

(57) ABSTRACT

A film is formed by casting a ribbon on a support from a flow cast die while pulling said ribbon toward said support by providing a decompression area. The decompression area is divided into a middle portion, a left portion and a right portion. Degrees of decompression in these three portions satisfy the following formulae:

$$0<(PC-PL)\times100/|PC|<15;$$

$$0<(PC-PR)\times100/|PC|<15;$$

$$|PL-PR|\times100/|0.5(PL+PR)|<10;$$

wherein PC is a degree of decompression in said middle portion, PL a degree of decompression in said left portion, and PR a degree of decompression in said right portion. The film obtained by the above method is suitable for a polarizing plate protection film, which is used for a liquid crystal display device.

26 Claims, 11 Drawing Sheets

FIG.8

| | V1 (%) | V2 (%) | L (mm) | \|LL-LR\| (mm) | S1/S2 | C1 (mm) | ΔC1 (mm) | C2 (mm) |
|---|---|---|---|---|---|---|---|---|
| EMBODIMENT 1 | 3 | 0 | 1 | 0.5 | 0.05 | 0.4 | 0.1 | 0.2 |
| EMBODIMENT 2 | 12 | 0 | 1 | 0.5 | 0.05 | 0.4 | 0.1 | 0.2 |
| COMPARISON 1 | 20 | 0 | 1 | 0.5 | 0.05 | 0.4 | 0.1 | 0.2 |
| EMBODIMENT 3 | 12 | 8 | 1 | 0.5 | 0.05 | 0.4 | 0.1 | 0.2 |
| COMPARISON 2 | 12 | 15 | 1 | 0.5 | 0.05 | 0.4 | 0.1 | 0.2 |
| EMBODIMENT 4 | 12 | 0 | 2 | 0.5 | 0.05 | 0.4 | 0.1 | 0.2 |
| COMPARISON 3 | 12 | 0 | 5 | 0.5 | 0.05 | 0.4 | 0.1 | 0.2 |
| EMBODIMENT 5 | 12 | 0 | 1 | 0.8 | 0.05 | 0.4 | 0.1 | 0.2 |
| COMPARISON 4 | 12 | 0 | 1 | 3.0 | 0.05 | 0.4 | 0.1 | 0.2 |
| EMBODIMENT 6 | 12 | 0 | 1 | 0.5 | 0.09 | 0.4 | 0.1 | 0.2 |
| COMPARISON 5 | 12 | 0 | 1 | 0.5 | 2 | 0.4 | 0.1 | 0.2 |
| COMPARISON 6 | 12 | 0 | 1 | 0.5 | 0.005 | 0.4 | 0.1 | 0.2 |
| EMBODIMENT 7 | 12 | 0 | 1 | 0.5 | 0.05 | 1.0 | 0.1 | 0.2 |
| COMPARISON 7 | 12 | 0 | 1 | 0.5 | 0.05 | 0.05 | 0.1 | 0.2 |
| COMPARISON 8 | 12 | 0 | 1 | 0.5 | 0.05 | 1.7 | 0.1 | 0.2 |
| EMBODIMENT 8 | 12 | 0 | 1 | 0.5 | 0.05 | 0.4 | 0 | 0.2 |
| COMPARISON 9 | 12 | 0 | 1 | 0.5 | 0.05 | 0.4 | 0.3 | 0.2 |
| EMBODIMENT 9 | 12 | 0 | 1 | 0.5 | 0.05 | 0.4 | 0.1 | 0.4 |
| COMPARISON 10 | 12 | 0 | 1 | 0.5 | 0.05 | 0.4 | 0.1 | 0.6 |

FIG.9

| | $\Delta d / d \times 100$ (%) | APPEARANCE | RESULT |
|---|---|---|---|
| EMBODIMENT 1 | 0.8 | — | ○ |
| EMBODIMENT 2 | 1.8 | — | ○ |
| COMPARISON 1 | 2.5 | — | × |
| EMBODIMENT 3 | 2.0 | — | ○ |
| COMPARISON 2 | 2.4 | — | × |
| EMBODIMENT 4 | 2.0 | — | ○ |
| COMPARISON 3 | 2.8 | INSTABILITY IN END PORTIONS | × |
| EMBODIMENT 5 | 2.0 | — | ○ |
| COMPARISON 4 | 2.3 | WAVY UNEVENNESS | × |
| EMBODIMENT 6 | 2.0 | — | ○ |
| COMPARISON 5 | 3.0 | — | × |
| COMPARISON 6 | 1.0 | RIBBON COHESION | × |
| EMBODIMENT 7 | 2.0 | — | ○ |
| COMPARISON 7 | 0.5 | ABRASION ON SUPPORT | × |
| COMPARISON 8 | 3.0 | — | × |
| EMBODIMENT 8 | 1.5 | — | ○ |
| COMPARISON 9 | 2.4 | — | × |
| EMBODIMENT 9 | 2.0 | — | ○ |
| COMPARISON 10 | 2.4 | — | × |

FIG.10

| | Δd/d×100 (%) | APPEARANCE | RESULT |
|---|---|---|---|
| EMBODIMENT 1 | 0.7 | — | ○ |
| EMBODIMENT 2 | 1.9 | — | ○ |
| COMPARISON 1 | 2.4 | — | × |
| EMBODIMENT 3 | 1.9 | — | ○ |
| COMPARISON 2 | 2.3 | — | × |
| EMBODIMENT 4 | 1.9 | — | ○ |
| COMPARISON 3 | 2.7 | INSTABILITY IN END PORTIONS | × |
| EMBODIMENT 5 | 1.9 | — | ○ |
| COMPARISON 4 | 2.2 | WAVY UNEVENNESS | × |
| EMBODIMENT 6 | 1.9 | — | ○ |
| COMPARISON 5 | 2.8 | — | × |
| COMPARISON 6 | 0.9 | RIBBON COHESION | × |
| EMBODIMENT 7 | 1.9 | — | ○ |
| COMPARISON 7 | 0.6 | ABRASION ON SUPPORT | × |
| COMPARISON 8 | 2.9 | — | × |
| EMBODIMENT 8 | 1.4 | — | ○ |
| COMPARISON 9 | 2.3 | — | × |
| EMBODIMENT 9 | 1.9 | — | ○ |
| COMPARISON 10 | 2.3 | — | × |

FIG.12

| | $\Delta d/d \times 100$ (%) | APPEARANCE | RESULT |
|---|---|---|---|
| EMBODIMENT 1 | 0.9 | — | ○ |
| EMBODIMENT 2 | 1.9 | — | ○ |
| COMPARISON 1 | 2.4 | — | × |
| EMBODIMENT 3 | 1.8 | — | ○ |
| COMPARISON 2 | 2.5 | — | × |
| EMBODIMENT 4 | 1.3 | — | ○ |
| COMPARISON 3 | 2.7 | INSTABILITY IN END PORTIONS | × |
| EMBODIMENT 5 | 1.8 | — | ○ |
| COMPARISON 4 | 2.4 | WAVY UNEVENNESS | × |
| EMBODIMENT 6 | 1.9 | — | ○ |
| COMPARISON 5 | 3.1 | — | × |
| COMPARISON 6 | 1.1 | RIBBON COHESION | × |
| EMBODIMENT 7 | 1.9 | — | ○ |
| COMPARISON 7 | 0.6 | ABRASION ON SUPPORT | × |
| COMPARISON 8 | 2.9 | — | × |
| EMBODIMENT 8 | 1.6 | — | ○ |
| COMPARISON 9 | 2.5 | — | × |
| EMBODIMENT 9 | 1.9 | — | ○ |
| COMPARISON 10 | 2.3 | — | × |

FIG.13

| | Δd/d × 100 (%) | APPEARANCE | RESULT |
|---|---|---|---|
| EMBODIMENT 1 | 0.8 | — | ○ |
| EMBODIMENT 2 | 2.0 | — | ○ |
| COMPARISON 1 | 2.5 | — | × |
| EMBODIMENT 3 | 1.6 | — | ○ |
| COMPARISON 2 | 2.3 | — | × |
| EMBODIMENT 4 | 1.2 | — | ○ |
| COMPARISON 3 | 2.6 | INSTABILITY IN END PORTIONS | × |
| EMBODIMENT 5 | 1.7 | — | ○ |
| COMPARISON 4 | 2.3 | WAVY UNEVENNESS | × |
| EMBODIMENT 6 | 1.8 | — | ○ |
| COMPARISON 5 | 2.9 | — | × |
| COMPARISON 6 | 1.0 | RIBBON COHESION | × |
| EMBODIMENT 7 | 1.7 | — | ○ |
| COMPARISON 7 | 0.7 | ABRASION ON SUPPORT | × |
| COMPARISON 8 | 2.8 | — | × |
| EMBODIMENT 8 | 1.5 | — | ○ |
| COMPARISON 9 | 2.4 | — | × |
| EMBODIMENT 9 | 1.9 | — | ○ |
| COMPARISON 10 | 2.4 | — | × |

FILM FORMATION METHOD CAPABLE OF PREVENTING FLUCTUATION OF RIBBON

BACKGROUND OF THE INVENTION

1. Field of the Invention

The present invention relates to a film formation method for casting a ribbon including polymer solution on a support from an extruder die. More specifically, the present invention relates to a film forming method in which the ribbon is cast on the support without fluctuation.

2. Background Arts

A cellulose triacetate film can be used as a support for a photosensitive material. The cellulose triacetate film is formed by a liquid film formation method, in which a filmy polymer solution in an organic solvent is cast onto the moving support from an extruder die. The filmy polymer solution ranged from a nozzle of the extruder die to the support is called as ribbon. In order to fix the ribbon on the support and to prevent introduction of the air into the polymer solution, JP-A 2-52721, JP-A 6-155494 and JP-A 10-264185 disclose a film forming method in which a decompression area is formed behind the extruder die by a decompression device. For the purpose of preventing introduction of the air, which is thought to vibrate the ribbon, it is also possible to provide side decompression area to reduce pressure in both lateral sides of the ribbon.

It is also possible to use a molten film forming method, in which a molten web material is cast onto a quench roll. In U.S. Pat. No. 4,310,295 (corresponding to JP-B 62-38133 and JP-B 63-57222) discloses a device for uniform web pinning in which a vacuum shoe housing is divided by a baffle into a primary area and a secondary area. Vacuum forces acting on the secondary zone do not cause air turbulence in the primary zone, so that molten web edges can be prevented from wobbling.

In the method for preventing wobble by providing the pressure reduction area, however, more decompression is required in order to increase the traveling speed of the support. In that case, high vacuum force is generated to produce more air turbulence in both lateral sides, which causes nonuniformity in edge portions of the ribbon. Moreover, in the method to provide side decompression areas, the pressure in the side decompression area is fluctuated when the ribbon is vibrated. Thus, the plainness of the film is decreased to damage the appearance of the products, and to have a serious influence on the subsequent processes such as film deformation process and film conveyance process.

SUMMARY OF THE INVENTION

In view of the foregoing, an object of the present invention is to provide a method for forming a film with good plainness by decreasing air turbulence and reducing vibration of the ribbon. And another object of the present invention is to provide various kinds of devices, such as a polarizing plate protection film and a liquid display crystal device, by use of a film which is produced by the method of the present invention.

To achieve the above objects, the film formation method to form a film by casting a ribbon on a support from a flow cast die while pulling the ribbon toward the support by providing a decompression area, satisfies the following formulae:

$$0<(PC-PL)\times 100/|PC|<15;$$

$$0<(PC-PR)\times 100/|PC|<15;$$

$$|PL-PR|\times 100/|0.5(PL+PR)|<10;$$

wherein PC is a degree of decompression in a middle portion of the decompression area, PL a degree of decompression in said left portion of the decompression area, and PR a degree of decompression in said right portion of the decompression area.

In the preferable embodiment, a decompression device for providing the decompression area is comprised of an outer seal extended in a direction parallel to a lateral direction of the ribbon, an inner seal provided in parallel to the outer seal with a certain interval, a pair of lateral end seals attached to both lateral end portion of the inner seal, inner side seals provided between the lateral end seals, a seal plate fixed on upper ends of the lateral end seals and the inner side seals, a pair of openings formed through the inner seal between the lateral side seal and the inner seal. The degrees of decompression PC, PL, PR can be changed by varying the size of the openings. The degree of decompression in the middle area is −1471 to −0.98 Pa.

The lateral end seal has a thickness of 3–10 mm, the method satisfying the following formulae:

$$L<(t/2)-0.5 \text{ mm};$$

$$|LL-LR|<1.0 \text{ mm};$$

$$0.01<(S1/S2)<0.1;$$

wherein L is a length from an end of a nozzle of the flow cast die to a center line of the lateral end seal with respect to a direction perpendicular to a casting direction of the ribbon, LL is a length from the center line to a left edge of the nozzle, and LR is a length from the center line to the right edge of the nozzle, S1 is an area of a first gap below the nozzle that is surrounded by the ribbon, the support, the lateral end seal, and a perpendicular line to the support from the front end of the lateral end seal, and S2 is an area of the second gap that is surrounded by the support, the perpendicular line, the bottom edge of the lateral end seal, a line from the bottom end of the inner seal to the bottom end of the outer seal, and a line extended from the outer edge of the outer seal to the support.

A clearance C1 between the support and the lower end of the lateral end seal is more than 0.1 mm and less than 1.2 mm, and an error of the clearance C1 is within ±1.0 mm. A clearance C2 between the nozzle of the die and the front end of the lateral end seal with respect to a casting direction of the ribbon is equal to or less than 0.5 mm.

The ribbon is made from a solution including equal to or more than 10 wt. % cellulose triacetate, the solution being solved in a solvent including 20–90 wt. % methyl acetate, 5–60 wt. % ketones, and 5–30 wt. % alcohols. The solution includes at least one kind of plasticizer of 0.1–20 wt. % to cellulose triacetate, at least one kind of ultraviolet ray absorbent of 0.001–5 wt. % to cellulose triacetate, at least one kind of finely divided powder of 0.001–5 wt. % to cellulose triacetate, at least one kind of release agent of 0.002–2 wt. % to cellulose triacetate, and at least one kind of fluorosurfactant of 0.001–2 wt. % to cellulose triacetate.

Two or more kinds of solutions including cellulose triacetate may be applied on the support at the same time. The film obtained by the above method is suitable for a polarizing plate protection film, which is used for a liquid crystal display device.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein:

FIG. 8 is a table showing conditions in first to fourth experiments;

FIG. 9 is a table showing a result of the first experiment;

FIG. 10 is a table showing a result of the second experiment;

FIG. 12 is a table showing a result of the third experiment;

FIG. 13 is a table showing a result of the fourth experiment; and

DETAILED DESCRIPTION OF THE EMBODIMENT

Figure 1:
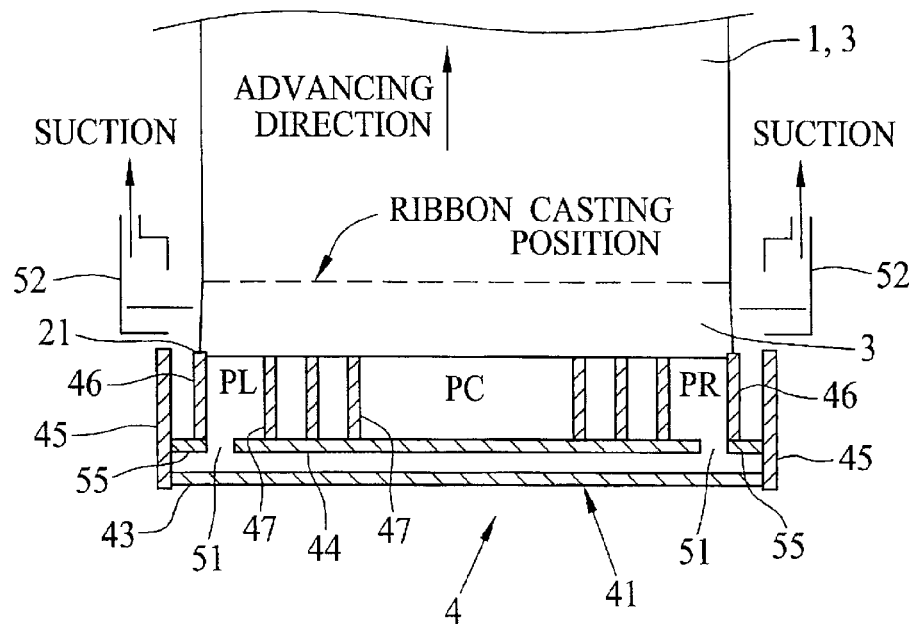
FIG. 1 is a top plan view in partial cross section showing a film forming apparatus for embodying the method of the invention.

The film formation method of the present invention is applicable to a liquid film formation method, a molten film formation method and so forth, which can produce optical purpose films and polymer films. Examples of the optical purpose films are a polarizing plate protection film and support films for supporting AR layer, LR layer and AG layers. And examples of the polymer films are supports for photosensitive materials. In the following embodiments, the liquid film formation method is used, but the molten film formation method is also applicable to the present invention.
Polymer In the liquid film formation method, examples of the polymer used for polymer solution in an organic solvent are polyamides, polyolefins (such as norbornene polymers), polystyrenes, polycarbonates, polysulfones, polyacryls, polymethacrylic acids (such as polymethyl methacrylate), polyetherketones, polyvinyl alcohols, polyvinyl acetates, cellulose derivative (such as ester of low fatty acid of cellulose). Among them, ester of low fatty acid of cellulose (cellulose acylate) is preferable. It is preferable for keeping the quality of the film to form the film from a solution including equal to or more than 10 wt. % cellulose acylate.

The ester of low fatty acid of cellulose includes fatty acids of less than seven carbon atoms. Preferably, two carbon atoms (cellulose acetate), three carbon atoms (cellulose propionate) and four carbon atoms (cellulose butylate). More preferably cellulose acetate, and desirably cellulose triacetate (acetylation ratio: 58.0–62.5%). It is possible to use ester of mixed fatty acid of cellulose, such as cellulose acetate propionate and cellulose acetate butylate.

Example of polymers in forming a film by the molten film formation method are polyethylene terephthalate and polyethylene-2,6-naphthalate.
Solvent As for the solvent, an organic solvent is preferable rather than an inorganic solvent. Examples of the organic solvent are methylene chloride, ketones (such as acetone, methyl ethyl ketone and cyclohexanone), esters (such as methylholmate, methylacetate and ethylacetate), ethers (such as dioxane, dioxolan, THF, diethyl ether and methyl-t-butyl ether), hydrocarbon (such as benzene, toluene, xylene and hexane), and alcohols (such as methanol, ethanol, n-propyl alcohol, isopropyl alcohol and n-butanol).

A liquid to swell the polymers are used as the solvent. Thus, the solvent is concretely determined in accordance with the kind of the polymer used in the film forming method. For instance, when cellulose triacetate, polycarbonates and polystyrenes are used as the polymers, it is preferable to use acetone, methyl acetate as the solvent. In case of using norbornene polymers, it is preferable to use benzene, toluene, xylene, hexane, acetone and methyl ethyl ketone as the solvent. In case of using polymethyl methacrylate, it is preferable to use acetone, methyl ethyl ketone, methyl acetate, butyl acetate and methanol as the solvent. Two or more kinds of solvents may be used together.

In consideration of the effect upon human body and an environment, it is preferable not to use the solvent including chlorine, such as methylene chloride. In the liquid film formation method, it is preferable to use a mixed solvent of methyl acetate, ketones and alcohols, mentioned above, for the purpose of preparing the dope. Especially, when cellulose acylate is chosen as the polymer, methyl acetate is preferable as the main solvent in view of solubility. In order to increase solubility of the polymers, ketones and alcohols may be mixed in methyl acetate. The solvent is preferably includes 20–90 wt. % methylacetate, 5–60 wt. % ketones, and 5–30 wt. % alcohols. The boiling point of the solvent is 20–300° C., preferably 30–200° C., more preferably 40–100° C.
Additives Plasticizer, ultraviolet ray absorbent, deterioration prevention agent, etc., may be added to the dope as additives.
Plasticizer Any suitable material may be used for the plasticizer. Preferable examples of phosphoric esters for the plasticizer are triphenyl phosphate, tricresyl phosphate, cresyl diphenyl phosphate, octyl diphenyl phosphate, diphenyl biphenyl phosphate, trioctyl phosphate, and tributyl photphate. Preferable examples of phthalic acid esters are diethyl phthalate, dimethoxyethyl phthalate, dimethyl phthalate, and dioctyl phthalate. Preferable examples of glycolic acid esters are triacetin, tributyrin, butyl phthalyl butyl glycolate, ethyl phthalyl ethyl glycolate, and methyl phthalyl ethyl glycolate. Two or more plasticizers shown above may be combined. Moreover, the plasticizer disclosed in JP-A 11-80381, JP-A 11-124445 and JP-A 11-248940 may be added to the dope. It is preferable that the amount of the plasticizers is 0.1–20 wt. % to the amount of cellulose acylate.
Ultraviolet Ray Absorbent A single kind of the ultraviolet ray absorbent, or the mixture of two or more kinds of the ultraviolet ray absorbents may be added to the dope. In case of using the film for a liquid crystal display, it is preferable that the ultraviolet ray absorbent is superior in absorption of the ultraviolet ray of the wavelength of equal to or less than 370 nm, in consideration of prevention of deterioration in characteristics of the liquid crystal. Moreover, in consideration of the displaying characteristics, it is preferable that the ultraviolet ray absorbent is permeable to visible light of the wavelength of equal to or more than 400 nm. Preferable examples of the ultraviolet ray absorbents are hydroxybenzophenone compounds, benzotriazole compounds, ester salicylate compounds, benzophenone compounds, cyano acrylate compounds, nickel complex salt compounds. More preferable ultraviolet ray absorbents are benzotriazole compounds and benzophenone compounds. Among them, benzotriazole compounds is desirable because of small unnecessary coloring to cellulose ester. Moreover, it is possible to add the ultraviolet ray absorbent of benzotriazoles which is disclosed in JP-A 8-29619, or ultraviolet ray absorbent disclosed in JP-A 8-239509. Other well-known ultraviolet ray absorbent may be added to the dope. It is desirable to add these ultraviolet ray absorbents to the dope at 0.001–5 wt. % to the amount of cellulose acylate.

Preferable examples of the ultraviolet ray absorbents are as follows:

2,6-di-tert-buthyl-p-cresol, pentaerythrityl-tetrakis[3-(3,5-di-tert-butyl-4-hydroxyphen yl)propionate], triethylene glycol-bis[3-(3-tert-butyl-5-methyl-4-hydroxyphenyl) propion ate], 1,6-hexandiole-bis[3-(3,5-di-tert-butyl-4-hydroxyphenyl) pro pionate], 2,4-bis-(n-octylthio)-6-(4-hydroxy-3,5-di-tert-butyl anilino)-1,3,5-triazine, 2-2-thio-diethylenebis[3-(3,5-di-tert-butyl-4-hydroxyphenyl )propionate], octadecyl-3-(3,5-di-tert-butyl-4-hydroxyphenyl) propionate, N,N'-hexamethylenebis(3,5-di-tert-butyl-4-hydroxyhydrocinn amide), 1,3,5-trimethyl-2,4,6-tris(3,5-di-tert-butyl-4-hydroxybenzi l) benzene, tris-(3,5-di-tert-butyl-4-hydroxybenzil)-isocyanurate Especially, it is more preferable to use 2,6-di-tert-buthyl-p-cresol, pentaerythrityl-tetrakis[3-(3,5-di-tert-butyl-4-hydroxyphen yl)propionate], and triethylene glycol-bis[3-(3-tert-butyl-5-methyl-4-hydroxyphenyl) propion ate]. The ultraviolet ray absorbent may be mixed with a metal inert agents of hydrazine compounds like N,N'-bis[3-(3,5-di-tert-butyl-4-hydroxyphenil)propionil]hyt razine, or with a processed phosphoric stabilizer such as tris(2,4-di-tert-butylphenyl)phosphite. It is preferable that an amount of these compounds are preferable to be 0.001–5 wt. % to the amount of cellulose acylate.

Finely Divided Powder

In order to improve lubricating property and resistance to adherence in hot and humid condition of the film, a mat agent can be used for the dope. The average height of projections on the surface of the mat agent is preferably 0.005–10 μm, more preferably 0.01–5 μm. More projections of the mat agent are preferable, but unnecessary large amount of the projections are not preferable since it causes a haze. As for the mat agent, both inorganic compounds and organic compounds are applicable. Examples of the inorganic compounds as the mat agent are powders of barium sulfate, colloidal manganese, titanium dioxide, barium strontium sulfate, silicon dioxide, aluminum oxide, tin oxide, zinc oxide, calcium carbonate, barium sulfate, talc, kaolin, and calcium sulfate. Moreover, it is possible to use silicon dioxide like a synthetic silica which is produced by a wet-process and gelation of silicic acid, or to use titanium dioxide (anatace and rutile structures) which is produced from a titanium slag and sulfuric acid. The mat agent may be obtained by classification (such as vibration filtering and wind classification) after crashing large inorganic grains of equal to or more than 20 μm.

Examples of the organic compounds as the mat agent are crushed and classified polymers such as polytetrafluoroethylene, cellulose acetate, polystyrene, polymethyl methacrylate, polypropyl methacrylate, polymethyl acrylate, polyethylene carbonate, acrylstyrene resins, silicone resins, polycarbonate resins, benzoguanamine resins, melamine resins, polyolefin resins, polyester resins, polyamide resins, polyimide resins, polyfluoroethylene resins, starch. These organic compounds are crashed and classified to obtain the fine grains. It is possible to use organic compounds obtained by the suspension polymerization method. It is also possible to use spherical organic or inorganic compounds obtained by the splay drying method or the dispersion method. Since the flexibility of the film is damaged by adding too much finely divided powders, an amount of the finely divided powders are preferably 0.001–5 wt. % to the amount of cellulose acylate.

Release Agent

For the purpose of easier release operation, a release agent may be added to the dope. Any suitable materials may be used for the release agent. Preferable examples are waxes with high melting point, higher fatty acid, salts and esters of higher fatty acid, silicone oil, polyvinyl alcohol, small molecular weight polyethylene, plant protein derivative. Since the release agent has influence on gloss and flatness of the film surface, an added amount of the release agent is preferably 0.002–2 wt. % to the amount of cellulose acylate.

Fluorosurfactant

Fluorosurfactant may be also added to the dope. The fluorosurfactant is a surface active agent in which fluorocarbon chains are contained as hydrophobic radicals, and has a function to reduce a surface tension remarkably. Thus, the fluorosurfactant is utilized as a coating agent in the organic solvent and an anti-static spray. Any suitable materials may be used as the fluorosurfactant, and the preferable examples are as follows:

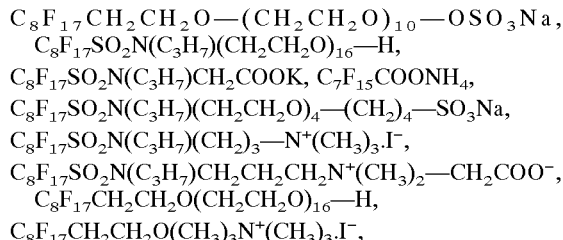

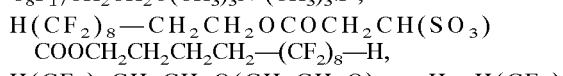

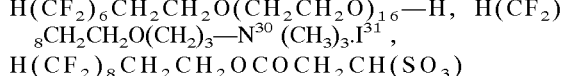

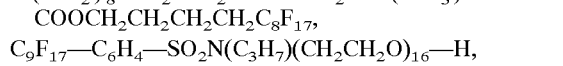

It is preferable to add the fluorosurfactant of 0.001–2 wt. % to the amount of cellulose acylate.

If necessary, various kinds of additives may be added to the dope in a period before preparation of the solution to after preparation. For instance, a thermal stabilizer of alkaline earth metals of calcium, magnesium, etc., an anti-static spray, a resistance agent for flame, a lubricant, a surfactant.

Preparation of the Dope

Swelling Process

At first, the above described cellulose triacetate powders are mixed with the solvent, so that the cellulose triacetate particles are swelled in the solvent. The temperature in the swelling process is preferably −10 to 55° C. The swelling process is usually carried out in a room temperature. The ratio of the cellulose triacetate to the solvent is determined in accordance with the density of the end solution. In general, the amount of the cellulose triacetate in the mixture is preferably 5–30 wt. %, more preferably 8–20 wt. %, and desirably 10–15 wt. %. It is preferable to stir the mixture of cellulose triacetate and the solvent until the cellulose triacetate is fully swelled. In the swelling process, it is possible to add ingredients other than the solvent and cellulose triacetate, such as plasticizer, deterioration prevention agent, dye and ultraviolet ray absorbent.

Heating Process

Next, the above dope is heated to 130° C. or more. The heating temperature is equal to or more than 130° C., preferably equal to or more than 160° C., desirably equal to or more than 180° C. However, the heating temperature of equal to or more than 250° C. causes decomposition of cellulose triacetate in the dope, so it is not preferable for keeping the quality the film. In that case, the heating speed is equal to or more than 1° C./min, preferably equal to or more than 2° C./min, more preferably equal to or more than 4° C./min, and desirably equal to or more than 8° C./min. It is preferable to increase the heating speed as much as possible, but the theoretical upper limit thereof is equal to or more than 10000° C./min. The technical upper limit is equal to or more than 1000° C./min, and the practical upper limit is equal to or more than 100° C./min. The heating speed is measured by dividing difference between an initial temperature before heating and an end temperature after heating by heating time. Any suitable apparatuses may be used for the heating process, and examples are an autoclave, a multiple-tube heat exchanger, a screw extruding machine and a static mixer.

The heating time is preferably from 20 sec to 4 hr. The heating time of less than 20 sec causes residual insoluble matter in the molten dope, which prevents formation of a film with high quality. In that case, to remove the insoluble matter by the filtering is unfavorable because it causes an extremely short filtration lifetime. Measurement of the heating time is started at the time when the temperature of the dope reaches a desired value, and ended at the time when chilling of the dope of the desired value is started. Chilling of the apparatus can be carried out by natural chilling and compulsory chilling.

Pressurization Process

In the above described heating process, it is preferable to heat the dope up to the temperature equal to or more than the boiling point in atmospheric pressure of the solvent under a pressure which is controlled such that the solution is not boiled. Pressurization process can prevent the dope from forming, so the uniform dope can be obtained. The pressure to the dope is determined in the relationship between the heating temperature and the boiling point of the solvent.

Chilling Process

In order to obtain a film with good optical characteristics, it is preferable to carry out the chilling process to chill the above described dope to −100 to −10° C. before the heating process. In using a system with hard solubility in a room temperature and a system with large amount of insoluble matter, chilling, heating or combining the both can prepare a good dope. By chilling, the solvent can be rapidly and effectively penetrated into cellulose triacetate, to promote the solution. The effective chilling temperature is −100 to −10° C. In the chilling process, an airtight container is preferably used for preventing the dope from getting mixed with moisture by condensation in chilling. Moreover, decompression in chilling can shorten the chilling time. A pressure-resistant container is desirable for performing decompression. The chilling process may be performed after the above described heating process. When the solution is not enough, the chilling process and the heating process may be repeated. Whether or not the solution is enough can be judged by visible observation of the appearance of the solution.

Film Formation

The dope obtained by the above described processes is poured in a mixing vessel and stirred by use of mixing blades, to make the dope uniform. In stirring, the dope may be mixed with additives such as a hydrophobic plasticizer and an ultraviolet ray absorbent. Then, the dope is transferred to a filtering machine to remove impurities. Using the dope obtained by the above process, the liquid film formation method is carried out to obtain a film.

By use of a flow cast die, the dope is cast on a flow cast band such that the thickness of the film after desiccation becomes 20–120 $\mu$m. The dope is solidified on the flow cast band to become a film. The flow cast process of the dope will be described afterward. The film on the flow cast band is peeled away by use of a peeling roller, and sent to a tenter drawing machine in which the film is drawn and dried while being fed. The drawn film is fed to a drying area, in which the film is dried while plural rollers feeds the film. Then, the film is fed to a chilling area in which the film is cooled down to a normal temperature, and is wound by a winding machine. It is preferable to perform the knurling and the trimming before winding of the film. Any well-known film forming method are applicable to the present invention.

Figure 2:
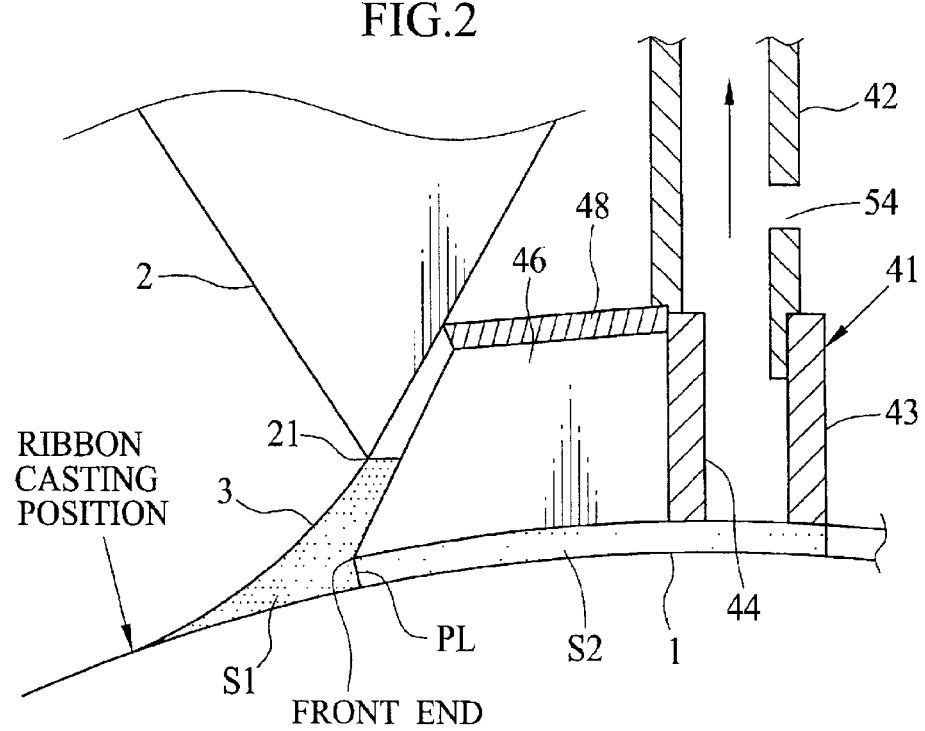
FIG. 2 is a vertical section showing a flow casting portion of the film forming apparatus.
Figure 3:
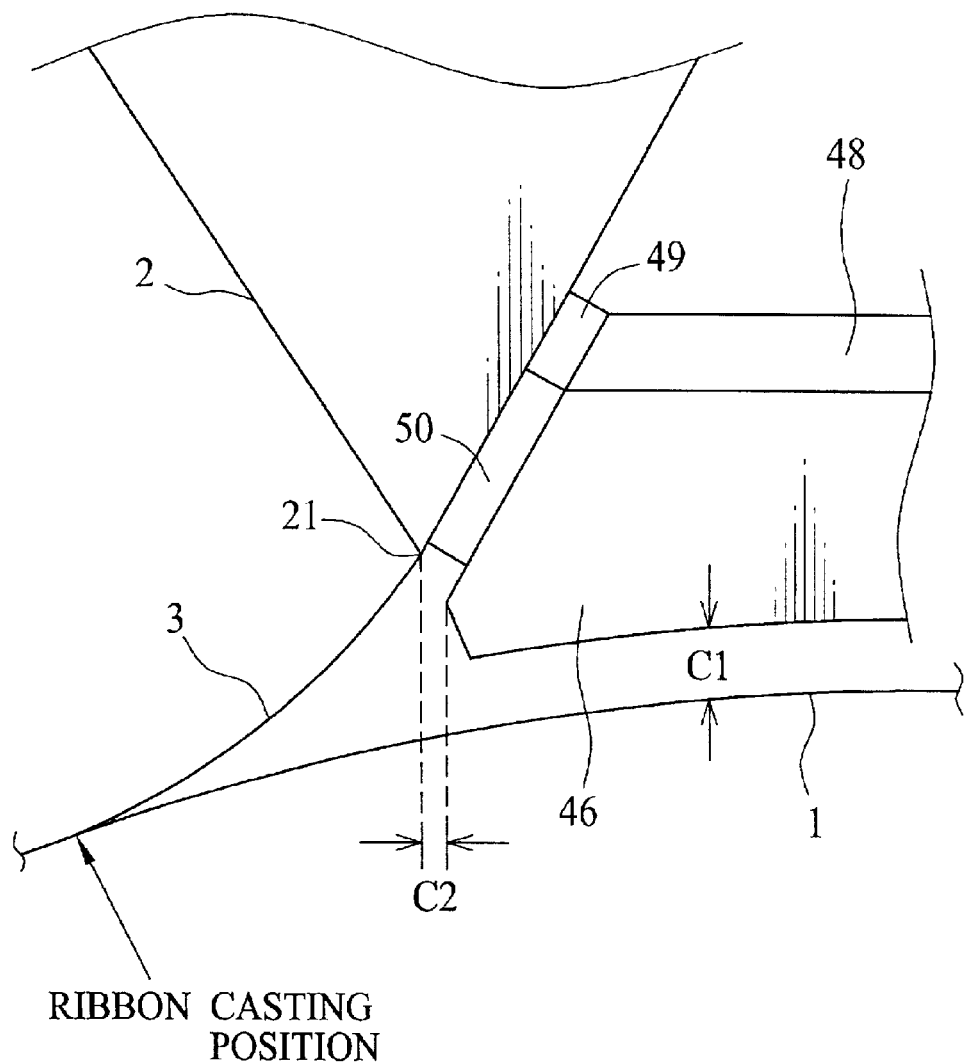
FIG. 3 is an enlarged vertical section showing a flow casting portion of the film forming apparatus.
Figure 4:
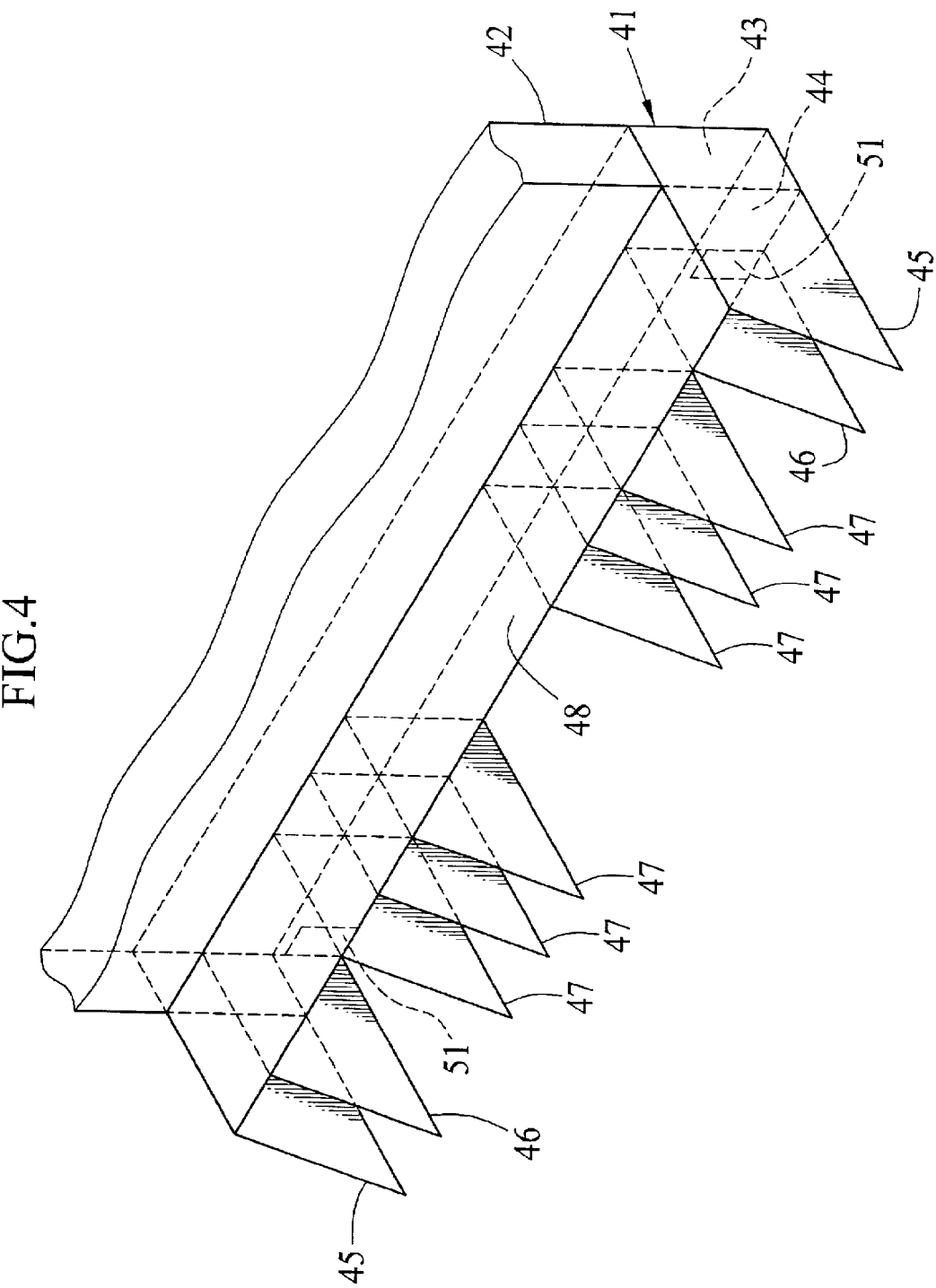
FIG. 4 is a simplified perspective view of a decompression device.

Referring to the drawings, an example of a film formation apparatus embodying the method of the present invention will be described. FIG. 1 is a top plan view of the film formation apparatus in which a flow cast die is omitted and a decompression device is partially broken away. FIG. 2 is a vertical section showing a flow casting portion of the film formation apparatus, and FIG. 3 is an enlarged vertical section showing the flow casting portion. FIG. 4 is a simplified perspective view of the decompression device of the film formation apparatus. In these drawings, the reference numeral 1 indicates a support, and the reference numeral 2 indicates a flow cast die. In the flow cast die 2 is contained a ribbon 3 which includes a polymer solution (dope). The flow cast die 2 casts a ribbon 3, which includes a polymer solution (dope), on the support 1 to form a film. A decompression device 4 is provided near the flow cast die 2, so that there is a decompression area in the vicinity of an upstream side of the ribbon 3 (primary side).

In FIGS. 1 and 2, the decompression device 4 has a box-shaped housing 41 and suction tubes 42 which are located near the housing 41 and connected with suction means (not shown). The housing 41 has an outer seal 43 and an inner seal 44 which are arranged along a lateral direction of the ribbon 3 at a slight interval. The inner seal 44 has an inner marginal seal 55 in both lateral end portions. Outer side seals 45 are attached to both lateral ends of the outer and inner seals 43, 44. There are lateral end seals 46 and inner side seals 47 which are fixed to the inner seal 44 by fixation brackets (not shown) and fixation pins (not shown).

The lateral end seals 46 and the inner side seals 47 have roughly trapezoidal shapes. The front sides of the lateral end seals 46 and the inner side seals 47 are almost parallel to the slope of the flow cast die 2, and the bottom sides thereof are almost parallel to the surface of the support 1. A seal plate 48 is fixed on the top end of the lateral end seals 46 and the inner side seals 47 by fixation brackets (not shown) and fixation pins (not shown). In FIG. 3, a first packing 49 is provided for closing a gap between the seal plate 48 and the flow cast die 2 in the lateral direction, and a second packing 50 is provided between the flow cast die 2 and the lateral end seal 46 so as to close a gap in the decompression area together with the first packing 49.

As shown in FIGS. 1 and 4, a pair of openings 51 are formed through the inner seal 44, each of which is positioned between the lateral end seal 46 and the inner side seal 47. The size of the opening 51 is suitably changeable by sliding operation to change the length of the opening 51 in the lateral direction, for instance.

A pair of decompression boxes 52 are provided in both lateral sides of the ribbon 3. In the decompression box 52, there is a side decompression area to prevent air turbulence, which is caused by decompression of the decompression device 4, in lateral end portions of the upstream side of the ribbon 3.

The decompression device 4 is designed to satisfy the following formulae:

$$0<(PC-PL)\times 100/|PC|<15;$$

$$0<(PC-PR)\times 100/|PC|<15;$$

wherein PC is a degree of decompression in the middle portion of the decompression area which is surrounded by the inner side seals 47, PL is a degree of decompression in the left portion of the decompression area surrounded by the lateral end seal 46 and the inner side seal 47, and PR is a degree of decompression in the right portion of the decompression area. Both values $(PC-PL)\times 100/|PC|$ and $(PC-PR)\times 100/|PC|$ are preferably within a range from 0 to 10. Adjustment of the pressures PC, PL, PR are carried out by changing the size of the opening 51. Moreover, the value $|PL-PR|\times 100/|0.5(PL+PR)|$ is equal to or less than 10, and preferably equal to or less than 5.

Figure 5:
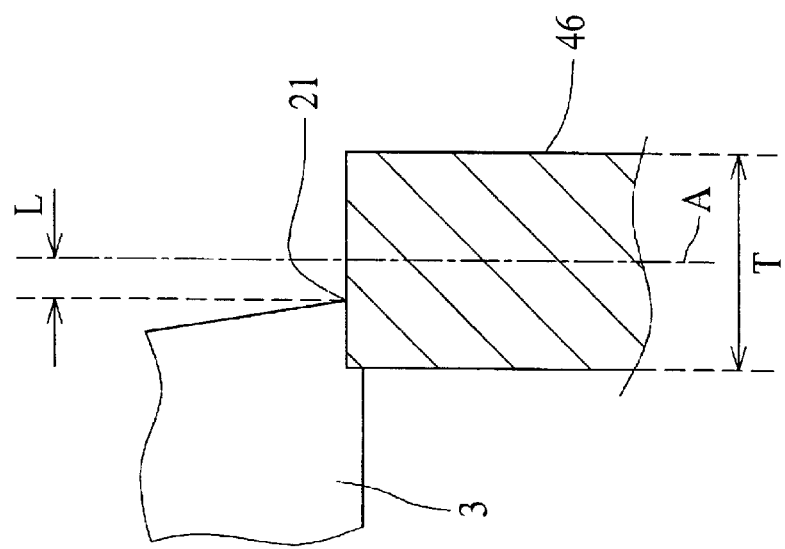
FIG. 5 is an explanatory view showing a relationship of positions between a nozzle of an extruder die and a lateral end seal.

In FIG. 5, the trim side seal 46 has a thickness T of 3–10 mm. Let L be a length from a center line A of the lateral end seal 46 to a lateral end of a nozzle 21 of the flow cast die 2. In that case, the absolute value of the length $|L|$ is preferably $0<|L|<|(T/2-0.5)|$ mm, more preferably $0<|L|<|(T/2-1.0)|$ mm. Moreover, the value $|LL-LR|$ is preferably equal to or less than 1.0 mm, more preferably equal to or less than 0.5 mm, wherein LL is a length from the center line A to a left edge of the nozzle 21, and wherein LR is a length from the center line A to a right edge of the nozzle 21. Such location of the lateral end seal 46 can decrease pressure fluctuation which is caused by vibration in marginal areas of the ribbon 3.

In FIG. 2, let S1 be an area of a first gap below the nozzle 21 that is surrounded by the ribbon 3, the support 1, the lateral end seal 46 or the inner side seal 47, and a perpendicular line PL to the support 1 from the front end of the lateral end seal 46 or the inner side seal 47. And let S2 be an area of a second gap that is surrounded by the support 1, the perpendicular line PL, the bottom edge of the lateral end seal 46 or the inner side seal 47, a line from the bottom edge of the inner seal 44 to the bottom edge of the outer seal 43, and a line extended from the outer edge of the outer seal 43 to the support 1.

At any position in the lateral direction of the ribbon 3, the ratio S1/S2 is preferably $0.01<(S1/S2)<0.1$, more preferably $0.01<(S1/S2)<0.05$. In order to decrease influence of pressure fluctuation in the decompression area, it is preferable to increase the area S2 of the second gap which has less influence to the ribbon 3 to the first gap. Making an opening 54 in the suction tube 42 is preferable, since the opening 54 is equivalent to increasing the area S2 of the second gap.

When the value C1 is determined as a clearance between the support 1 and bottom end of the lateral end seal 46 (and the outer side seal 45 and the inner side seal 47), the value C1 is preferably $0.1<C1<1.2$ mm, and more preferably $0.1<C1<0.8$ mm. A preferable tolerable error range of the value C1 is within ±1.0 mm. Let C2 be the length between the nozzle 21 of the flow cast die 2 and the front end of the lateral end seal 46 and the inner side seal 47 with respect to the direction parallel to the support 1. The distance C2 is preferably equal to or less than 0.5 mm, more preferably equal to or less than 0.2 mm.

Product

The film obtained by the above processes can be used as a protective sheet for the polarizing plate. The polarizing plate can be produced by sticking the protective sheet on both surfaces of a polarizing film which is formed out of polyvinyl alcohol and so forth. The film can be used as an optical characteristic compensation film by sticking it on an optical characteristic compensation sheet. Moreover, the film can be used as an optical functional film like an antireflection film by stacking it an antireflection layer on the film. These products can be used for manufacturing a liquid crystal display device.

Multiple Flow Casting

Figure 7:
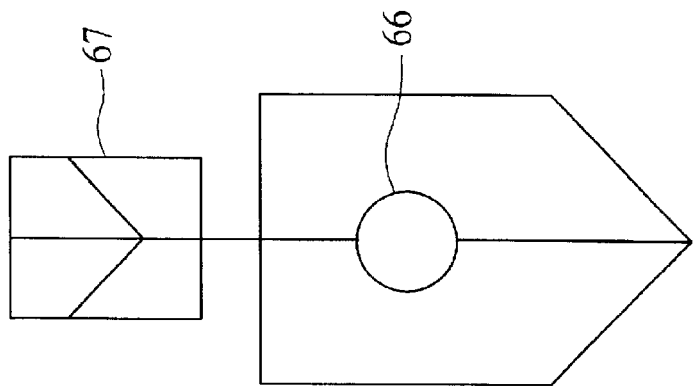
FIG. 7 is a schematic view of the second embodiment of the extruder die.
Figure 6:
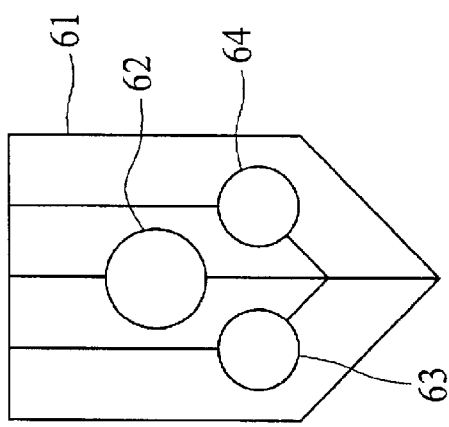
FIG. 6 is a schematic view of the first example of the extruder die.

In the liquid film formation method of the present invention, two or more kinds of dopes may be simultaneously applied on the support to form a film with plural layers. In the multiple-dope application, it is possible to use a multiple flow cast die 61 of multiple manifold type shown in FIG. 6, and a multiple flow cast die 65 of feedblock type shown in FIG. 7. In FIG. 6, the multiple cast die 61 includes three manifolds 62, 63, 64, so that a three-layer film can be produced. In FIG. 7, the multiple cast die 65 has a manifold 66 and a feedblock 67. Different kinds of the dopes are forwarded to the feedblock 67 to make dopes of plural layers, which is cast on the support 1. In forming a film by casting a three-layer dopes, the inner layer of the dope contains large amount of cellulose triacetate, and the outer layer and a surface layer of the dope contains relatively small amount of cellulose triacetate. These three dopes are cast on the support 1 at the same time, to produce a film with excellent characteristics in flatness, transparency and forming workability. But these above described embodiments do not limit the casting process of the liquid film formation method of the present invention.

Embodiment

Experiment A

In experiment A, the dope has the following composition.

| | |
|---|---|
| cellulose triacetate (acetylation ratio of 60.2%) | 17.58 parts by weight |
| dichloromethane | 65 parts by weight |
| methanol | 14 parts by weight |
| m-butanol | 1 part by weight |

-continued

| triphenyl phosphate | 1.6 parts by weight |
|---|---|
| biphenyl diphenyl phosphate | 0.8 part by weight |
| colloidal silica | 0.02 part by weight |

After preparing the dope from the above composition, plural films are formed by changing various conditions. A thickness T of the lateral end seal is 5 mm. A casting speed of the ribbon 3 is 50 m/min. The degree of decompression PC is −98.1 Pa (−10 mmAq). A thickness of the film is 80 μm. Other formation parameters are shown in FIG. 8, in which comparison means a comparative embodiment, V1 represents the value (PC−PL)×100/|PC|, V2 represents the value |PL−PR|×100/|0.5(PL+PR)|, $\overline{L}$ is an average value of L. R terraced unevenness value, appearance and result, which will be described later, are shown in FIG. 9.

Experiment B

In experiment B, the dope has the following composition.

| cellulose triacetate (acetylation ratio of 59.7%) | 20.58 parts by weight |
|---|---|
| methyl acetate | 60 parts by weight |
| acetone | 8 parts by weight |
| ethanol | 10 parts by weight |
| triphenyl phosphate | 1.6 parts by weight |
| biphenyl diphenyl phosphate | 0.8 part by weight |
| colloidal silica | 0.02 part by weight |

After preparing the dope from the above composition, a plurality of films are formed by changing various conditions. A thickness of the side seal T is 5 mm. A casting speed of the ribbon 3 is 50 m/min, and a degree of decompression PC is −343.2 Pa (−35 mmAq). A thickness of the film is 40 μm. Other formation conditions are the same as those in Experiment A. R terraced unevenness value, appearance and result are shown in FIG. 10.

Experiment C, D

Figure 11:
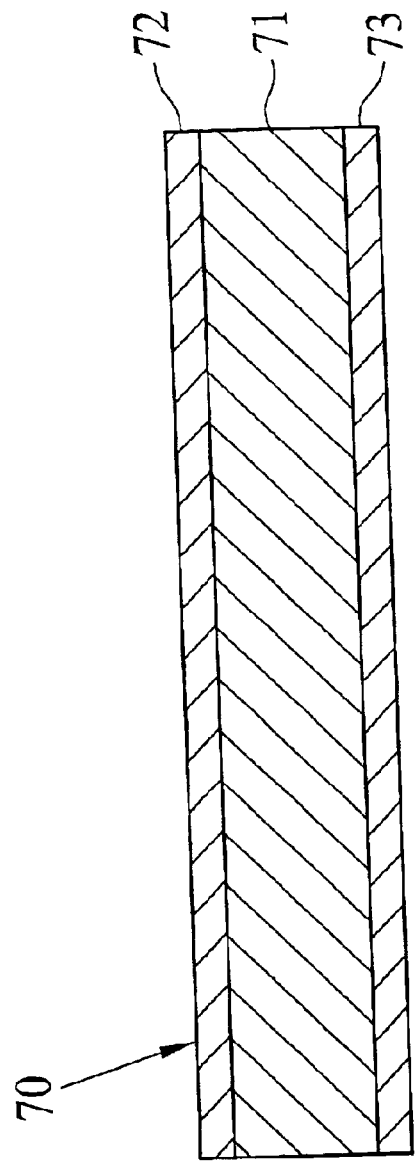
FIG. 11 is a sectional view of a film which is formed by a multi-casting method of the present invention.
Figure 14:
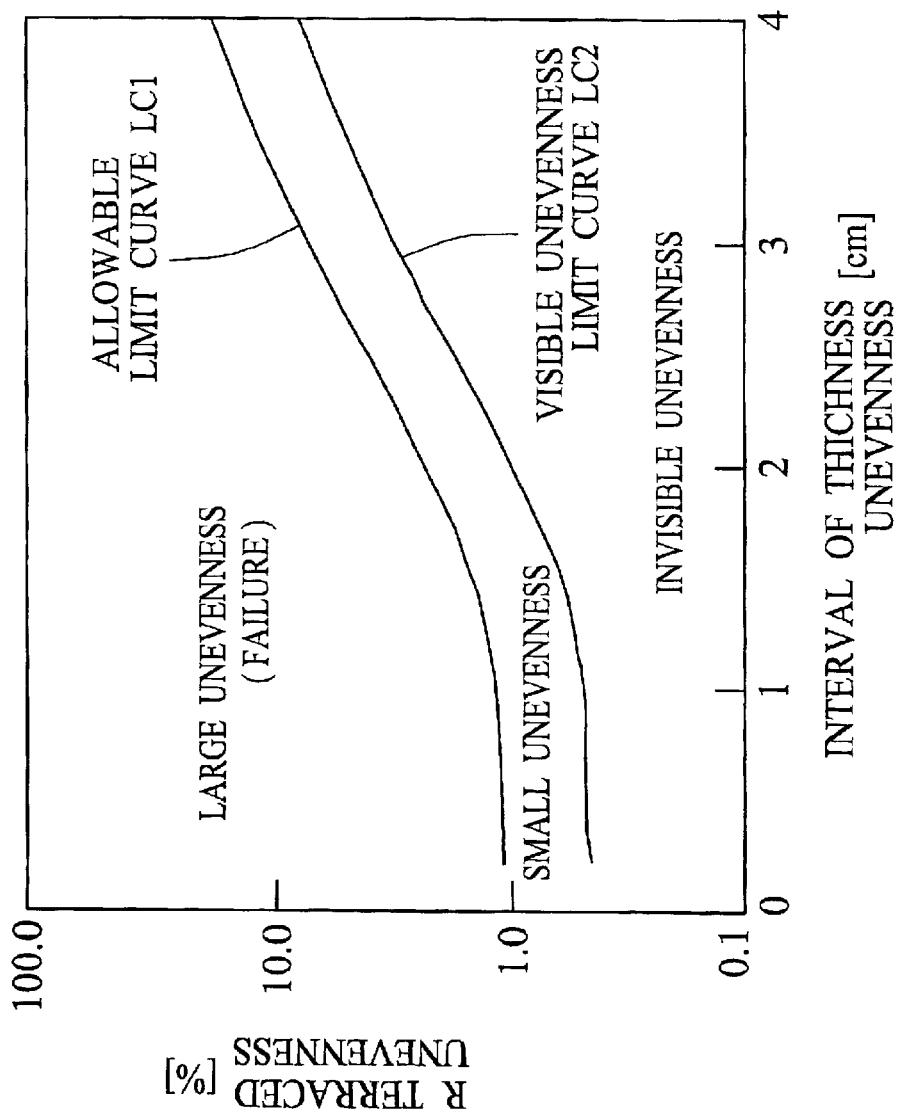
FIG. 14 is a graph showing evaluation of the terrace unevenness of the film.

In Experiment C, the film is made from the dope used in Experiment A by use of a multiple flow cast die 65 of feedblock type shown in FIG. 7. In Experiment D, on the other hand, the film is made from the dope used in Experiment B by use of the multiple flow cast die 65. As shown in FIG. 11, the film 70 obtained in Experiment C, D includes an inner layer 71, a surface layer 72 and a back layer 73. A dry thickness of the inner layer 71 is 50 μm. The amount of cellulose acetate of the dope for the surface and back layers 72, 73 is 5% smaller than that for the inner layer 71. A dry thickness of the surface and back layers 72, 73 is 5 mm. In Experiment C, D, a thickness of the side seal T is 5 mm. A casting speed of the ribbon 3 is 60 m/min, and a degree of decompression PC is −245.2 Pa (−25 mmAq). R terraced unevenness value, appearance and result are respectively shown in FIG. 12 (Experiment C) and FIG. 13 (Experiment D).

R terraced unevenness value, appearance and result are determined in accordance with the following way.

R Terrace Unevenness Evaluation

As set above, R terrace unevenness measured by dividing a difference (Δd) between a maximum thickness unevenness and a minimum one by an average thickness (d) of the film. It is possible to calculate R terrace unevenness by monitoring the thickness of the film in the lengthwise direction and detecting periodical maximum and minimum thickness unevenness and an average thickness. It is also possible to measure R terrace unevenness by analyzing the frequency spectrum of the measured thickness and detecting the maximum peak value. Continuous measurement of the thickness of the film can performed by use of a continuous thickness measurement machine of contact and non-contact type.

Appearance

An appearance of the film is visually observed.

Result Judgment

An excellent sample in R terrace unevenness and appearance is judged to be passing. Others are judged failure. R terrace unevenness evaluation is carried out by use of a graph shown in FIG. 9, in which a relationship between R terrace unevenness and an interval of thickness unevenness. In FIG. 9, an allowable limit curve LC1 is determined in accordance with the following equation:

$$d=0.64a^3-0.91a^2+0.6a+1.01$$

wherein a (cm) is an interval of thickness unevenness and d (%) is an R level unevenness. Moreover, an unevenness disappear limit curve LC2 is determined in accordance with the following equation:

$$d=0.19a\ 3-0.38a_{2+0.25}\ a+0.42$$

For instance, when the interval of the thickness unevenness is 20 mm, an allowable R terrace unevenness limit is 2.25.

In Experiments B, D, a solvent with chlorine, like dichloromethane, is not used in dope preparation since it affects a human body and an environment. In the above experiments, the solvent contains 77 wt. % methyl acetate, 10 wt. % ketones (acetone), and 13 wt. % alcohols (methanol). In that case, the cellulose triacetate is easily solved in the solvent, so good dope can be prepared.

Thus, the present invention is not to be limited to the above embodiments, but on the contrary, various modifications are possible to those skilled in the art without departing from the scope of claims appended hereto.

What is claimed is:

1. A method for forming a film by casting a ribbon on a support from a flow cast die while pulling said ribbon toward said support by providing a decompression area, said decompression area having at least a middle portion, a left portion and a right portion, said method satisfying the following formulae:

$$0<(PC-PL)\times 100/|PC|<15;$$

$$0<(PC-PR)\times 100/|PC|<15;$$

$$|PL-PR|\times 100/|0.5(PL+PR)|<10;$$

wherein PC is a degree of decompression in said middle portion, PL a degree of decompression in said left portion, and PR a degree of decompression in said right portion.

2. A method as claimed in claim 1, wherein said decompression area is produced by use of a decompression device; wherein said decompression device is comprised of an outer seal extended in a direction parallel to a lateral direction of said ribbon, an inner seal provided in parallel to said outer seal with a certain interval, a pair of lateral end seals attached to both lateral end portion of said inner seal, inner side seals provided between said lateral end seals, a seal plate fixed on upper ends of said lateral end seals and said inner side seals, a pair of seal openings each of which is formed through said inner seal between said lateral side seal and said inner side seal; and wherein said degrees of decompression PC, PL, PR are changed by varying the size of said seal openings.

3. A method as claimed in claim 2, wherein said lateral end seal has a thickness of 3–10 mm, said method satisfying the following formulae:

$$L < (t/2) - 0.5 \text{ mm};$$
$$|LL - LR| < 1.0 \text{ mm};$$

wherein L is a length from an lateral end of a nozzle of said flow cast die to a center line of said lateral end seal with respect to a direction perpendicular to a casting direction, LL is a length from said center line to a left edge of said nozzle, and LR is a length from said center line to a right edge of said nozzle.

4. A method as claimed in claim 2, satisfying the following formula:

$$0.01 < (S1/S2) < 0.1;$$

wherein S1 is an area of a first gap below said nozzle that is surround by said ribbon, said support, said lateral end seal or said inner side seal, and a perpendicular line to said support from a front end of said lateral end seal or said inner side seal; and wherein S2 is an area of a second gap that is surrounded by said support, said perpendicular line, a bottom edge of said lateral end seal or said inner side seal, a line from a bottom end of said inner seal to a bottom end of said outer seal, and a line extended from an outer edge of said outer seal to said support.

5. A method as claimed in claim 4, wherein a suction tube of said decompression device has a tube opening to increase said area S2 substantially.

6. A method as claimed in claim 2, wherein a pair of side decompression areas are provided in the vicinity of both lateral end portions of said ribbon; and wherein said side decompression area being surrounded by a vertical line to said support from said nozzle, said ribbon and said support, and suppresses turbulence in end portions of said ribbon which is caused by decompression by use of said decompression device.

7. A method as claimed in claim 2 wherein a clearance C1 between said support and the lower end of said lateral end seal is more than 0.1 mm and less than 1.2 mm; and wherein an error of said clearance C1 is within ±1.0 mm.

8. A method as claimed in claim 2, wherein a clearance C2 between said nozzle of said die and the front end of said lateral end seal with respect to a casting direction of said ribbon is equal to or less than 0.5 mm.

9. A method as claimed in claim 2, wherein a second packing is provided between said seal plate and said flow cast die, and a second packing is provided between said flow cast die and said lateral end seal.

10. A method as claimed in claim 2, wherein said inner side seal and said lateral end seal are tightly attached to said inner seal and said seal plate.

11. A method as claimed in claim 10, wherein said degree of decompression in said middle area is −1471 to −0.98 Pa.

12. A method as claimed in claim 11, wherein said ribbon is made from a solution which includes equal to or more than 10% wt. cellulose acylate.

13. A method as claimed in claim 12, wherein said cellulose acylate is cellulose triacetate.

14. A method as claimed in claim 13, wherein a solvent for solving said cellulose triacetate solution includes 20–90 wt. % methyl acetate, 5–αwt. % ketones, and 5–30 wt. % alcohols.

15. A method as claimed in claim 12, wherein said solution includes at least one kind of plasticizer, an amount of said plasticizer being 0.1–20 wt. % to the amount of cellulose acylate.

16. A method as claimed in claim 12, wherein said solution includes at least one kind of ultraviolet ray absorbent, an amount of said ultraviolet ray absorbent being 0.001–5 wt. % to the amount of cellulose acylate.

17. A method as claimed in claim 12, wherein said solution includes at least one kind of finely divided powder, an amount of said finely divided powder being 0.001–5 wt. % to the amount of cellulose acylate.

18. A method as claimed in claim 12, wherein said solution includes at least one kind of release agent, an amount of said release agent being 0.002–2 wt. % to the amount of cellulose acylate.

19. A method as claimed in claim 12, wherein said solution includes at least one kind of fluorosurfactant, an amount of said fluorosurfactant being 0.001–2 wt. % to cellulose acylate.

20. A method as claimed in claim 12, wherein two or more kinds of solutions including cellulose acylate are applied on said support at the same time.

21. A method as claimed in claim 2, wherein said lateral end seal has a thickness of 3–10 mm, said method satisfying the following formulae:

$$L < (t/2) - 0.5 \text{ mm};$$
$$|LL - LR| < 1.0 \text{ mm};$$
$$0.01 < (S1/S2) < 0.1;$$

wherein L is a length from an end of a nozzle of said flow cast die to a center line of said lateral end seal with respect to a direction perpendicular to a casting direction of said ribbon, LL is a length from said center line to a left edge of said nozzle 21, and LR is a length from said center line to a right edge of said nozzle;

wherein S1 is an area of a first gap below said nozzle that is surround by said ribbon, said support, said lateral end seal or said inner side seal, and a perpendicular line to said support from a front end of said lateral end seal or said inner side seal, and S2 is an area of a second gap that is surrounded by said support, said perpendicular line, a bottom edge of said lateral end seal or said inner side seal, a line from a bottom end of said inner seal to a bottom end of said outer seal, and a line extended from an outer edge of said outer seal to said support; and wherein a clearance C1 between said support and the lower end of said lateral end seal is more than 0.1 mm and less than 1.2 mm, an error of said clearance C1 is within ±1.0 mm, and a clearance C2 between said nozzle of said die and the front end of said lateral end seal with respect to a casting direction of said ribbon is equal to or less than 0.5 mm.

22. A method as claimed in claim 21, wherein a pair of side decompression areas are provided in the vicinity of both lateral end portions of said ribbon; and wherein said side decompression area being surrounded by a vertical line to said support from said nozzle, said ribbon and said support, and suppresses turbulence in end portions of said ribbon which is caused by decompression by use of said decompression device.

23. A method as claimed in claim 22, wherein said degree of decompression in said middle area is −1471 to −0.98 Pa.

24. A method as claimed in claim 23, wherein said ribbon is made from a solution including equal to or more than 10 wt. % cellulose triacetate, said solution being solved in a solvent including 20–90 wt. % methyl acetate, 5–60 wt. % ketones, and 5–30 wt. % alcohols.

25. A method as claimed in claim 24, wherein said solution includes at least one kind of plasticizer of 0.1–20 wt. % to cellulose triacetate, at least one kind of ultraviolet ray absorbent of 0.001–5 wt. % to cellulose triacetate, at least one kind of finely divided powder of 0.001–5 wt. % to cellulose triacetate, at least one kind of release agent of 0.002–2 wt. % to cellulose triacetate, and at least one kind of fluorosurfactant of 0.001–2 wt. % to cellulose triacetate.

26. A method as claimed in claim 25, wherein two or more kinds of solutions including cellulose triacetate are applied on said support at the same time.

* * * * *